Dec. 19, 1922.

S. THOMPSON.
CONDENSING STEAMER.
FILED AUG. 1, 1921.

1,439,204.

Inventor,
Salmon Thompson, by
Attorney.

Patented Dec. 19, 1922.

1,439,204

UNITED STATES PATENT OFFICE.

SALMON THOMPSON, OF CEDAR FALLS, IOWA.

CONDENSING STEAMER.

Application filed August 1, 1921. Serial No. 489,003.

*To all whom it may concern:*

Be it known that I, SALMON THOMPSON, a citizen of the United States of America, and a resident of Cedar Falls, Blackhawk County, Iowa, have invented certain new and useful Improvements in Condensing Steamers, of which the following is a specification.

My invention relates to improvements in condensing steamers, and the object of my invention is to provide an apparatus capable of alternative use as a steam-condenser or a steam-storing means, and including a boiler with means for filling it.

Figure 1:
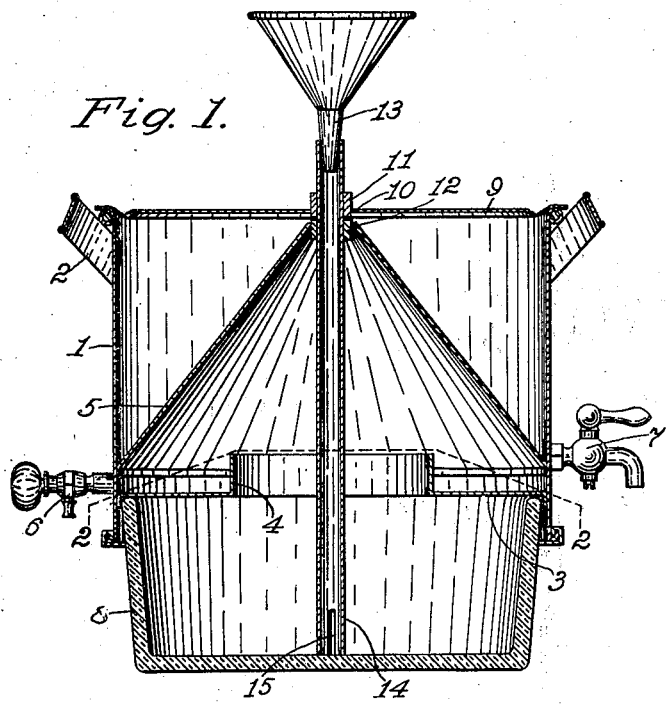
Figure 2:
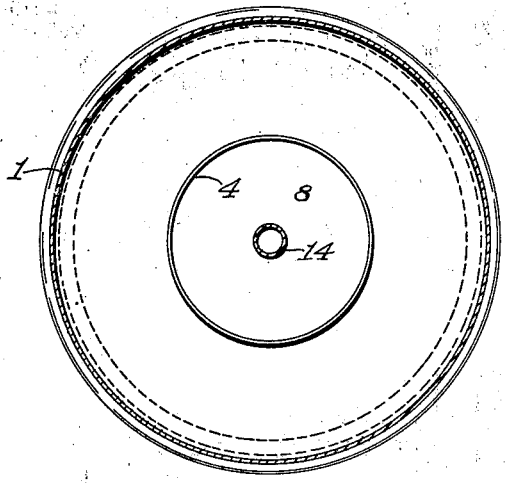

This object I have accomplished by the means which are hereinafter described and claimed, and which are illustrated in the accompanying drawings, in which Fig. 1 is a vertical central section of my improved apparatus, and Fig. 2 is a horizontal section thereof, taken on the broken line 2—2 of said Fig. 1 looking downwardly.

Similar numerals of reference denote similar parts throughout the several views.

The numeral 8 denotes an open top vessel, hereinafter denominated the boiler, and which may preferably be constructed of glass, china or other material which is practically non-corrosive by hot or boiling water or other liquids, rather than of iron or plated metal which will not sustain the action of such liquids or of the direct application of heat.

However, as a boiler made of such material is often frangible because of the slow conduction of heat therethrough when first applied, I have supplied a contacting element 14, hereinafter described and explained, to serve in the equalization of the heat to prevent liability to cracking of the boiler.

The numeral 1 denotes a receptacle with open top closed by a centrally-orificed cover 9, and having hollow ears 2 on opposite sides for lifting it. The bottom plate 3 of this receptacle has a central opening and is raised above the lower depending edge thereof, so that the upper edge of the boiler 8 may fit within the angle of the said bottom plate and said depending part. About the central opening of the bottom plate 3 is a raised rim 4.

The numeral 5 denotes a hollow cone mounted concentrically within the receptacle 1 over said rimmed opening 4, and has an apical orifice in which may be fitted a hollow cork 12. A like hollow cork 11 is fitted in the central orifice 10 of the cover 9. The apex of the cone 5 terminates short of the cover 9. A drain-cock 7 is in communication with the receptacle 1 above the cone 5, and another drain-cock 6 opens into the part of said receptacle about said rim 4, which serves as an annular container for water of condensation.

The numeral 14 denotes a tubular metal body open at both ends, preferably made of copper or other metal which is a good conductor of heat, and whose lower end has a short slot 15, said tube extending from its contacting support on the bottom of said boiler through the cone 5 and hollow corks 12 and 11 to have its open upper end above the cover 9 to receive the filling funnel 13.

When used as a steam-condenser, the receptacle 1 is filled about the cone 5 nearly to the top with water, and water is placed in the boiler 8 by means of said funnel 13 and tube 14, passing into the boiler through the slot 15. Heat applied to the bottom of said boiler boils the water therein, whose steam, rising, is condensed on the inner wall of the cone 5, the water of condensation running down into the bottom of the cone whence it may be withdrawn as distilled water by way of the cock 6.

When the apparatus is used as a steamer, no water is placed in the receptacle 1 about said cone 5, the hollow cork 11 in the cover 9 may be replaced by a solid cork, and after the water in the boiler is heated nearly to boiling point the tube 14 is removed, (before replacement of the cork 11) to permit steam to pass into the receptacle 1, whose interior may receive vegetables or other things to be steamed.

As the tube 14 is a good heat conductor, it serves to equalize the initial conduction of heat throughout the frangible boiler 8, to prevent fracture thereof. This insures longevity of the boiler, and permits the use of any glass or china vessel or of an earthenware container for this purpose.

Having described my invention, what I claim as new, and desire to secure by Letters Patent, is:

1. A device of the character described, comprising an open top boiler, a hollow conical steam inclosure upon and in communication with said boiler, having within its hollow an open top receptacle for water of condensation, having without it a surrounding receptacle to contain cooling liquid immersing the outer wall of the conical inclosure, a slotted filling tube supported removably upon the bottom of said boiler and extending through said steam inclosure, and independent means for draining off the contents of said inclosure and said receptacle.

2. A device of the character described, comprising an open top boiler, a hollow orificed conical steam inclosure upon and in communication with said boiler, having without it a surrounding open-top receptacle, means for draining said receptacle, a removable orificed cover for said receptacle, a tubular filler having one end slotted and resting on the bottom of said boiler with its upper part extending through the orifices of said conical inclosure and said cover, and means for closing the joints between said tube and said inclosure and cover.

Signed at Waterloo, Iowa, this 30th day of June, 1921.

SALMON THOMPSON.